United States Patent
Onodera et al.

(10) Patent No.: US 6,700,677 B1
(45) Date of Patent: Mar. 2, 2004

(54) PRINTING APPARATUS, DATA OUTPUT APPARATUS AND COMPUTER READABLE MEMORY MEDIUM

(75) Inventors: Ken Onodera, Yokohama (JP); Koichiro Akimoto, Fujisawa (JP); Hideki Sakai, Sakura (JP); Takeshi Utsunomiya, Yokohama (JP); Takanori Nishijima, Tokyo (JP); Kiyohiro Tsunekawa, Kawasaki (JP); Junichi Mori, Kawasaki (JP); Masahiro Takayanagi, Takasaki (JP); Takashi Okazawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,175

(22) Filed: Dec. 20, 1999

(30) Foreign Application Priority Data

Dec. 22, 1998 (JP) .......................................... 10-365008

(51) Int. Cl.[7] .............................................. G06K 15/00
(52) U.S. Cl. ..................................... 358/1.15; 358/1.14
(58) Field of Search ........................ 358/1.1, 1.6, 1.13, 358/1.14, 1.15, 402, 403; 715/907, 522; 399/79, 80, 81; 705/18, 40, 52, 57–59

(56) References Cited

U.S. PATENT DOCUMENTS 6,119,108 A * 9/2000 Holmes et al. ............... 705/40

* cited by examiner

*Primary Examiner*—Arthur G. Evans
(74) *Attorney, Agent, or Firm*—Fitzpatrick, Cella, Harper & Scinto (57) ABSTRACT

In a printing apparatus in which a part of the execution program is downloaded from the host computer, the invention allows the user to easily known the copyright information of the execution program and to select the use of such copyright. The host computer sends print data to the laser beam printer constituting the printing apparatus and downloads a part of the execution program. At the same time, the copyright information and the license information of the execution program are transmitted to the laser beam printer. The control unit of the laser beam printer processes the data based on the execution program, thereby recording the data on the recording sheet, and displays the copyright information and license information on the operation panel. Observing the display, the user selects whether or not to obtain the license by the operation panel.

8 Claims, 5 Drawing Sheets

PRINTING APPARATUS, DATA OUTPUT APPARATUS AND COMPUTER READABLE MEMORY MEDIUM

BACKGROUND OF THE INVENTION

1. Field of the Invention

The present invention relates to a printing apparatus for executing a printing operation by downloading a part of the execution program from an external equipment such as a host computer, a data output apparatus such as a host computer for sending data to the printing apparatus, and a computer readable memory medium adapted for use in such apparatus.

2. Related Background Art

Conventionally, the printing apparatus in which a part of the execution program is downloaded from a host computer is mostly connected in a one-to-one relationship with the host computer, so that the copyright information and the license information on the execution program to be downloaded are displayed in such host computer in the downloading side, and the user executes downloading after confirming such copyright information or license information.

However, with the recent progress in the network technology including the internet and intranet, there is increasing the configuration in which the printing apparatus is directly connected to a network and is connected therethrough with plural host computers. Also, as observed in the IPP (internet printer protocol), there is also supported a function of data acquisition by active access to the host computer from the printing apparatus.

In such situation, it is extremely difficult for the user to identify which execution program is to be downloaded from which host computer to the printing apparatus to be used by the user and to recognize the copyright information and the license information for such execution program.

SUMMARY OF THE INVENTION

In consideration of the foregoing, the object of the present invention is to facilitate, in a printing apparatus in which a part of the execution program is downloaded, the recognition of the copyright information of such program by the user.

The above-mentioned object can be attained, according to an embodiment of the present invention, by a printing apparatus comprising data input means for entering data including print data, a part of the execution program and information on the copyright of the execution program; display means for displaying thus entered information on the copyright; data print means for processing the entered print data and printing the print data on a recording sheet; and control means for controlling the data print means according to a part of the entered execution program.

According to an embodiment of the present invention, there is also provided a data output apparatus comprising output means for outputting, to the printing apparatus, data including print data, a part of the execution program and information on the copyright of the execution program.

According to an embodiment of the present invention, there is also provided a memory medium storing a program for executing a data input process for entering data including print data, a part of the execution program and information on the copyright of the execution program; a display process for displaying thus entered information on the copyright; and a data print process for processing the entered print data according to a part of the entered execution program and printing the print data on a recording sheet.

Also according to another embodiment of the present invention, there is provided a memory medium storing a program for executing an output process for outputting, to the printing apparatus, data including print data, a part of the execution program and information on the copyright of the execution program.

Other objects of the present invention, and the features thereof, will become fully apparent from the following description, which is to be taken in conjunction with the attached drawings.

DETAILED DESCRIPTION OF THE PREFERRED EMBODIMENTS

In the following the present invention will be clarified in detail by preferred embodiments, with reference to the attached drawings.

Figure 2:
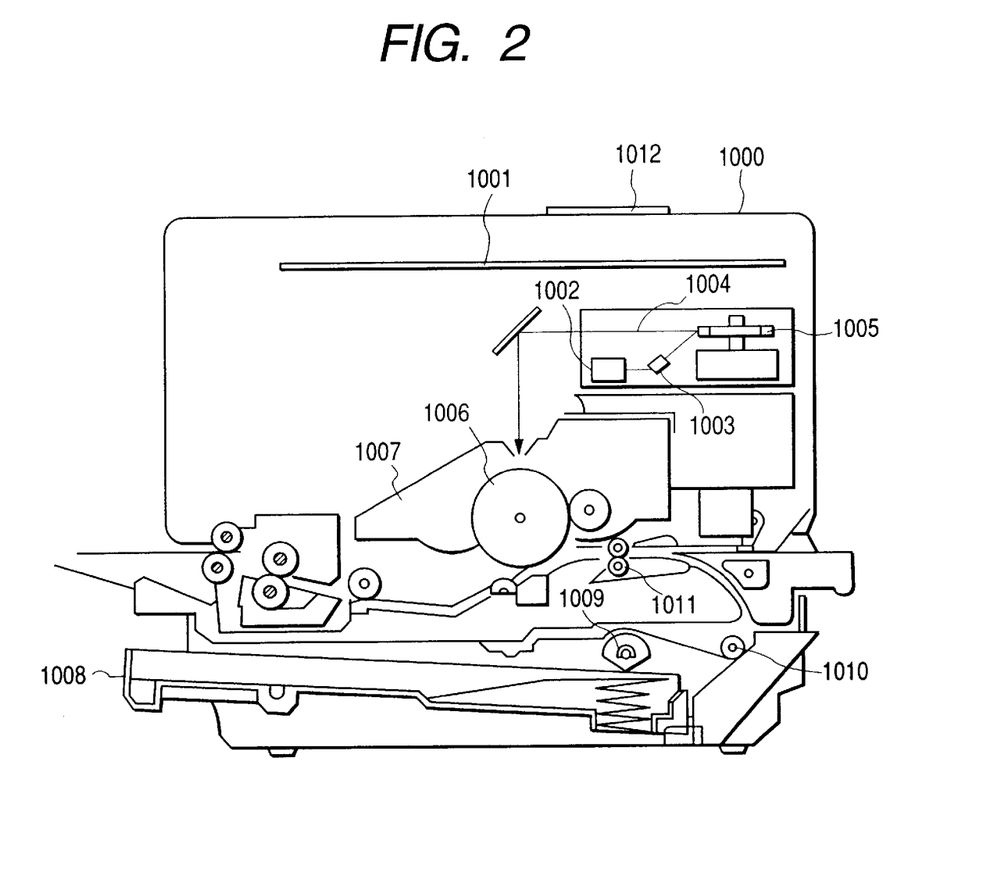
FIG. 2 is a view showing the configuration of a printing apparatus embodying the present invention.

FIG. 2 is a cross-sectional view showing the internal configuration of a laser beam printer (LBP) constituting a printing apparatus embodying the present invention. The LBP is capable of registering a character pattern or form data from an unrepresented data source.

Referring to FIG. 2, an LBP 1000 enters and stores character information (character code), form information and a macro instruction etc. supplied from an externally connected host computer (10 in FIG. 3) and forms an image on a recording sheet by generating a character pattern or a form pattern according to such information. An operation panel 1012 is provided with switches and an LED display unit.

A control unit 1001 controls the entire LBP 1000 and analyzes the character information etc. supplied from the host computer. The control unit 1001 principally executes conversion of the character information into a video signal of the corresponding character pattern, for supply to a laser driver 1002.

A laser driver 1002 for driving a semiconductor laser 1003 turns on and off a laser beam 1004 according to the input video signal. The laser beam 1004 is laterally deflected by a rotary polygon mirror 1005 to form an electrostatic latent image on an electrostatic drum 1006. The latent image is developed by a developing unit 1007 provided around the electrostatic drum 1006, and the developed image is transferred onto the recording paper, which is composed of a cut sheet. The cut recording sheet is contained in a sheet cassette 1008, and is supplied therefrom by a feed roller 1009 and conveying rollers 1010, 1011 to the electrostatic drum 1006.

Figure 3:
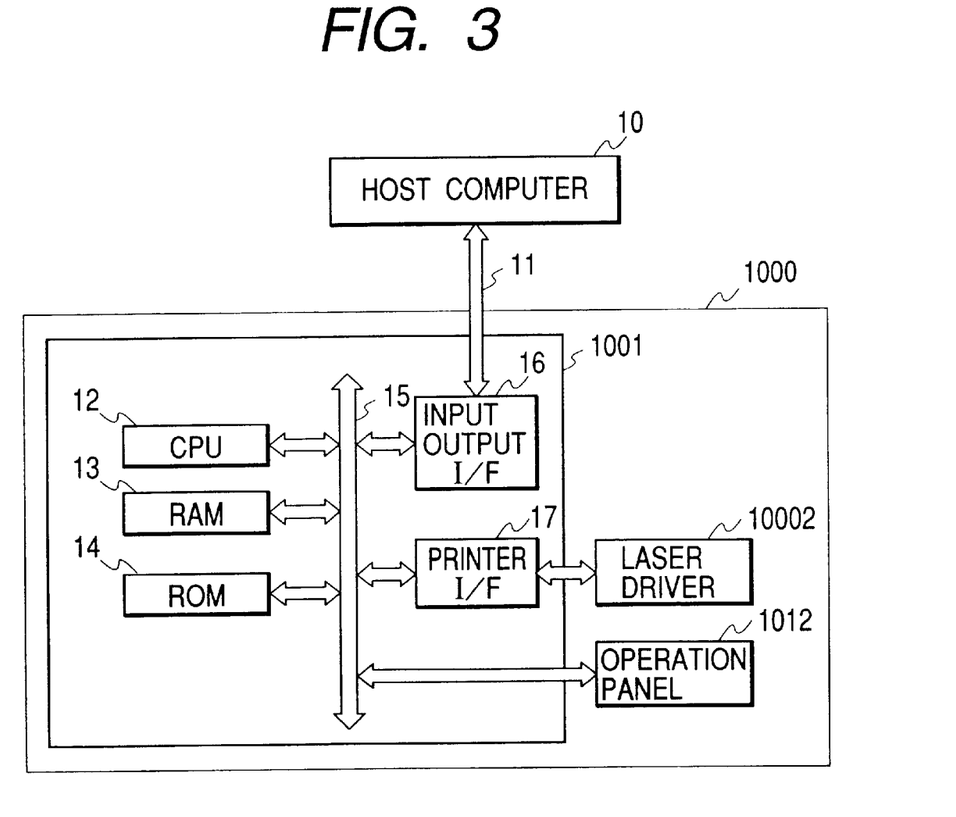
FIG. 3 is a block diagram of a control system for the printing apparatus embodying the present invention.

FIG. 3 shows the configuration of the control system for the LBP 1000.

Referring to FIG. 3, the control system is composed of a control unit 1001 mentioned above, a CPU 12, a RAM 13, a ROM 14, an input/output interface 16, a printing unit interface 17 etc. These units are connected by a system bus 15, which is also connected to the operation panel 1012. The printing unit I/F 17 is connected to the laser driver 1002.

The input/output I/F 16 is connected, through a predetermined I/F 11, to the above-mentioned host computer 10. The host computer 10 sends, to the control unit 1001, data of character or image in a printer language format or a part of the program for controlling the control unit 1001 in a format to be explained later.

The operation panel 1012 is provided with a LCD display unit capable of displaying kana characters and alphanumeric characters in a row by 16 columns, and a switch for selecting "YES" or "NO".

The CPU 12 collectively controls the access of the host computer 10 to various units connected to the system bus 15, based on a control program stored in the ROM 14 or the RAM 13, and also controls the image output to the laser driver 1002 through the printer unit I/F 17. The CPU 12 also executes communication with the host computer 10 through the input/output I/F 16 and the I/F 11.

The laser driver 1002 records the image information, entered through the printing unit I/F 17, on the recording sheet.

The ROM 14 stores, in addition to the control program mentioned above, font data to be used in the generation of the above-mentioned image information.

The RAM 13 functions as a main memory and a work area for the CPU 12, and is used as a buffering area for the input/output data, a developing area for the drawing information, a storage area for the environmental data, and a storage area for the program and data to be downloaded.

In the following there will be explained, with reference to FIGS. 1 and 4, the functions of the 1st embodiment of the present invention.

Figure 4:
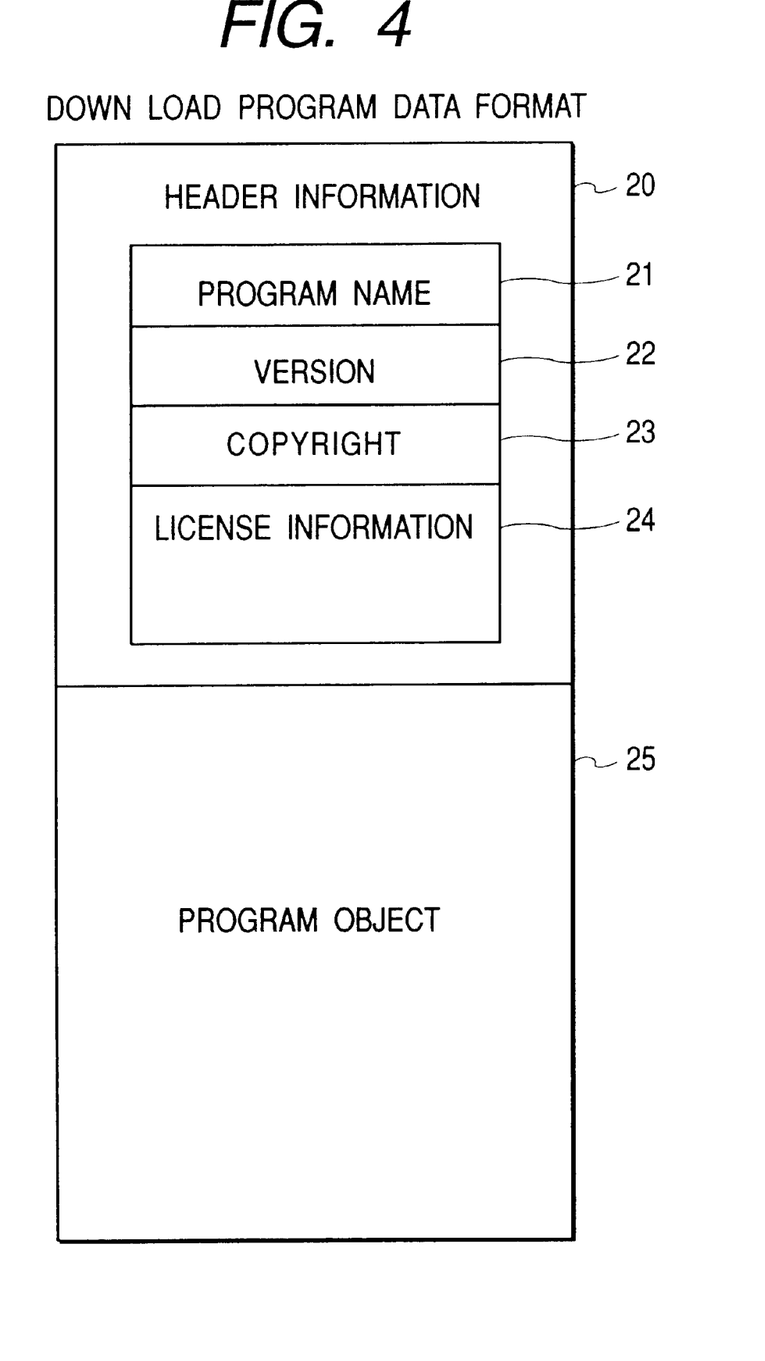
FIG. 4 is a view showing the format of download program data.

FIG. 4 shows the data format of the download program, downloaded from the host computer 10.

In FIG. 4, a header information 20 contains a program name character train 21, a version character train 22, a copyright character train 23, a license information character train 24 etc. A program object 25 constitutes a part of the program for controlling the control unit 1001 by the CPU 12. These data are stored in the RAM 13 for execution.

Figure 1:
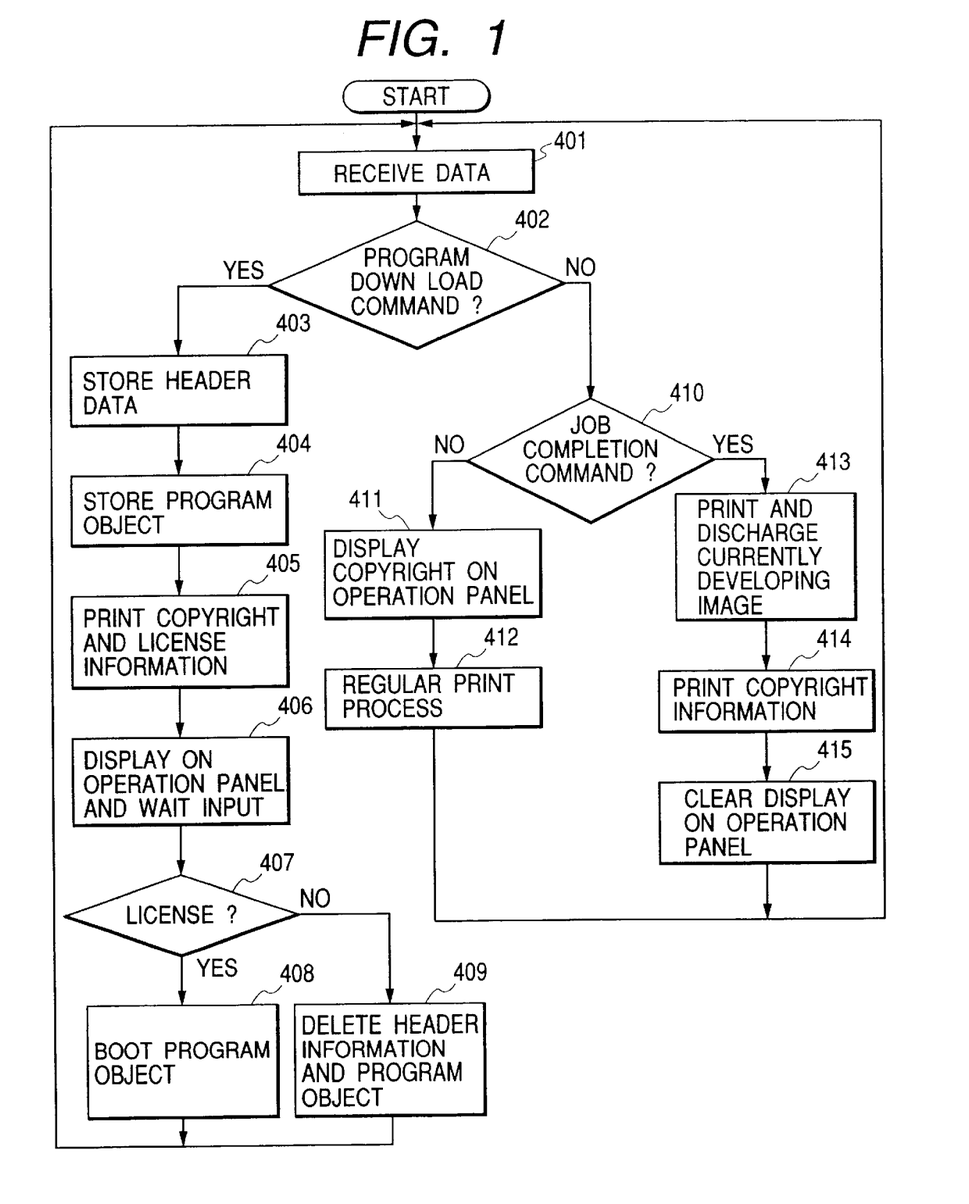
FIG. 1 is a flow chart showing the process in a printing apparatus constituting a 1st embodiment of the present invention.

FIG. 1 is a flow chart showing the printing process controlled by the host computer 10 and the control unit 1001.

At first, when the power supply is turned on, a step 401 causes the input/output I/F 16 to receive data from the host computer 10 through the interface 11, and reads data of a unit code. Then a step 402 discriminates whether the entered data are a program download command.

If it is identified as a program download command, a step 403 stores the header information 20 of the program download data in a predetermined area of the RAM 13. Then a step 404 stores the program object 25 of the program download data in a predetermined area of the RAM 13.

Then a step 405 reads the copyright information character train 23 and the license information character train 24, contained in the header information 25, from the RAM 13, then reads a character pattern corresponding to the character code from the font data stored in the ROM 14, develops the character pattern in a drawing memory area of the RAM 13 and sends it to the laser driver 1002 through the print unit I/F 17, for recording on the recording sheet.

Then a step 406 outputs a character message "LICENSE AGREED" on the LCD panel of the operation panel 1012, and there is awaited the depression of the switch "YES" or "NO" on the operation panel 1012. When either switch is depressed, a step 407 discriminates whether the switch "YES" or "NO" is depressed, namely whether the license of the copyright is agreed or not.

In case it is identified that the switch "YES" has been depressed, the sequence proceeds to a step 408 to execute the process of a boot portion of the downloaded program object 25 and to install the download program, and the sequence returns to the step 401.

On the other hand, in case it is identified that the switch "NO" has been depressed, the sequence proceeds to a step 409 to delete the header information 20 and the program object 25 in the downloaded program data stored in the RAM 13 and then returns to the step 401.

In case the step 402 identifies that the entered data are not the program download command, the sequence proceeds to a step 410 for discriminating whether the entered data are a job end command.

If not, a step 411 reads the copyright information of the program under current execution from the RAM 13 or the ROM 14 and displays such information on the LCD of the operation panel 1012. Then a step 412 processes the printer language, composed for example of graphics, characters, images etc., then develops the data in the image memory of the RAM 13 and sends the developed data through the printing unit I/F 17 to the laser driver 1002 for recording on the recording sheet, whereupon the sequence returns to the step 401.

In case the step 410 identifies that the entered data are a job end command, the sequence proceeds to a step 413 to transmit the unoutputted data, currently developed in the image memory, through the printing unit I/F 17 to the laser driver 1002 for recording on the recording sheet. Then a step 414 reads the copyright information 23 of the program under current execution from the RAM 13 or the ROM 14, then reads a character pattern corresponding to the character code from the font data stored in the ROM 14, develops the character pattern in the image memory area of the RAM 13 and sends it to the laser driver 1002 through the print unit I/F 17, for recording on the recording sheet. Then a step 415 clears the LCD of the operation panel 1012, and the sequence returns to the step 401.

In the following there will be explained the functions of the 2nd embodiment, with reference to FIG. 5. The configurations of the apparatus and the control system are same as those shown in FIGS. 2 and 3, and the format of the download program data is same as that shown in FIG. 4.

Figure 5:
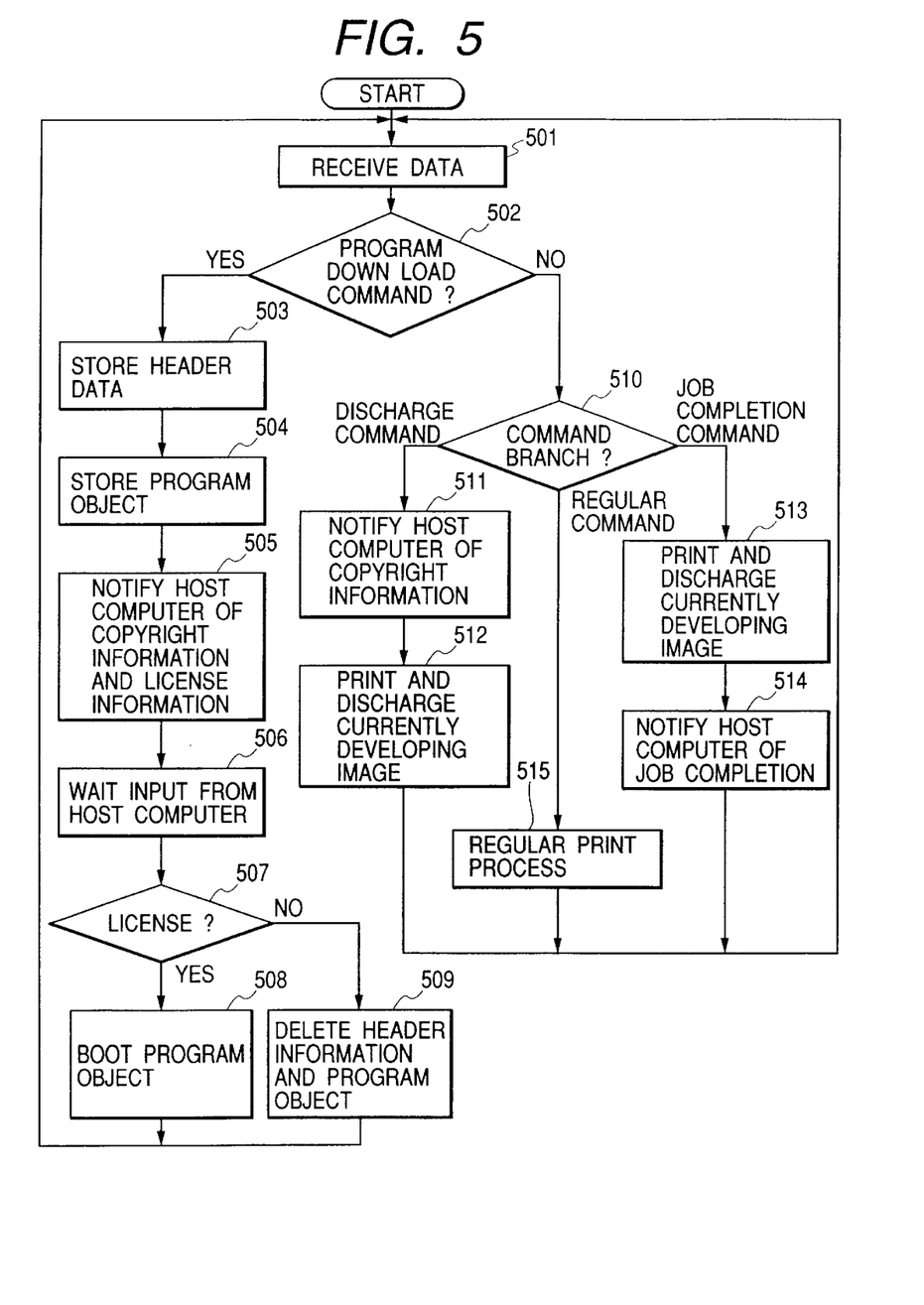
FIG. 5 is a flow chart showing the process in a printing apparatus constituting a 2nd embodiment of the present invention.

Referring to FIG. 5, when the power supply is turned on, a step 501 causes the input/output I/F 16 to receive data from the host computer 10 through the interface 11, and reads data of a unit code. Then a step 502 discriminates whether the entered data is a program download command.

If it is identified as a program download command, a step 503 stores the header information 20 of the program download data in a predetermined area of the RAM 13. Then a step 504 stores the program object 25 of the program download data in a predetermined area of the RAM 13.

Then a step 505 reads the copyright information character train 23 and the license information character train 24, contained in the header information 25, from the RAM 13, and informs these information to the host computer 10 through the input/output I/F 16 and the I/F 11. The host computer 10 displays the informed information on the LCD, thereby causing the user to agree to the license of copyright.

Then a step 506 awaits a response "YES" or "NO" from the host computer 10. When the response is entered from the host computer 10, a step 507 discriminates whether the response is "YES" or "NO".

In case the response is "YES", a step 508 deletes the downloaded program object 25 and the sequence returns to the step 501.

In case the response is "NO", a step 509 deletes the header information 20 and the program object 25 of the download program data stored in the RAM 13, and the sequence returns to the step 501.

In case the aforementioned step 502 identifies that the entered data is not the program download command, the sequence proceeds to a step 510 for discriminating whether the entered data is a job end command, a sheet discharge command or otherwise.

In case of a sheet discharge command, a step 511 reads the copyright information character train 23 of the program under current execution from the RAM 13 or the ROM 14, and informs the information to the host computer 10 through the input/output I/F 16 and the I/F 11. Then a step 512 transmits the unoutputted data, currently developed in the image memory, through the printing unit I/F 17 to the laser driver 1002 for recording on the recording sheet, and the sequence returns to the step 501.

In case the step 510 identifies a job end command, the sequence proceeds to a step 513 for transmitting the unoutputted data, currently developed in the image memory, through the printing unit I/F 17 to the laser driver 1002 for recording on the recording sheet. Then a step 514 informs the host computer 10 of the end of the current job, and the sequence returns to the step 501.

In case the entered data is judged not a sheet discharge command nor a job end command, a step 515 processes the printer language, composed of graphics, characters, images etc. and executes development in the image memory of the RAM 13, and the sequence returns to the step 501.

The aforementioned embodiments allows to display or output the copyright information and the license information associated with a downloaded program, thereby allowing the user to use such program after confirmation of such information. It is also possible to display or output the copyright information even during the program execution.

In the foregoing embodiments, there has been explained the application of the present invention to a laser beam printer, but the present invention is likewise applicable to the printers of other types, such as ink jet system, LED system, dot impact system or thermal transfer system.

Also in the foregoing embodiments, the copyright information is printed at the end of job, but it may also be printed at the start of job or may be added as footer information on all the recording sheets.

Also in the foregoing embodiments, the licensing of the program is executed at the downloading, but it may be executed at each execution of the program.

In the following there will be explained a memory medium of the present invention.

The system consisting of the blocks shown in FIG. 3 may be composed of a computer system including a CPU 12 and a memory such as the ROM 14, and, in such case, the above-mentioned memory constitutes the memory medium of the present invention. Such memory medium stores a program for executing the process sequence for controlling the above-described functions, according to the flow chart shown in FIG. 1 or 5.

The memory medium can be composed of a semiconductor memory such as a ROM or a RAM, or an optical disk, a magnetooptical disk or a magnetic medium. It may also be composed of a CD-ROM, a floppy disk, a magnetic tape, a magnetic card or a non-volatile memory card.

Consequently, it is possible to realize the functions and the effects similar to those in the foregoing embodiments, thereby attaining the objects of the present invention, by employing the above-described memory medium in a system or an apparatus other than those shown in FIGS. 2 and 3 and causing such system or a computer thereof to read and execute the program codes stored in the memory medium.

It is furthermore possible to realize the functions and the effects similar to those in the foregoing embodiments, thereby attaining the objects of the present invention, also in case an operating system or the like functioning on the computer executes all the process or a part thereof, or in case the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes.

In case of downloading a part of the execution program from a host computer to the printing apparatus, the embodiments of the present invention, as explained in the foregoing, enters the copyright information of the execution program into the printing apparatus and displays such information on the printing apparatus, whereby the user can easily know the copyright information of the execution program downloaded into the printing apparatus to be used by the user.

Also in case the copyright information is license information, the user is rendered possible to easily select whether or not to use such execution program based on the displayed information.

What is claimed is:

1. A printing apparatus comprising:
   first input means for entering image information;
   second input means for entering at least a part of an execution program;
   third input means for entering copyright information of the execution program;
   display means for displaying the copyright information of the execution program; and
   print control means for executing the part of the execution program, thereby controlling a print process of the image information,
   wherein said display means displays the copyright information of the execution program during the controlling of the print process of the image information by said print control means.

2. A printing apparatus according to claim 1, wherein said display means displays the information by printing using a printing means.

3. A printing apparatus according to claim 1, wherein said display means includes output means for outputting the copyright information to an external device.

4. A printing apparatus according to claim 1, wherein said display means is provided on an operation panel.

5. A printing apparatus according to claim 1,
   wherein the copyright information is information regarding a license of the part of the execution program.

6. A printing apparatus according to claim 1, further comprising selection means by which the user selects whether or not to allow input of the part of the execution program.

7. A printing method comprising:

a first input step of entering image information;

a second input step of entering at least a part of an execution program;

a third input step of entering copyright information of the execution program;

a display step of displaying the copyright information of the execution program; and a print control step of executing the part of the execution program, thereby controlling a print process of the image information, wherein said display step displays the copyright information of the execution program during the controlling of the print process of the image information in said print control step.

8. A computer readable memory medium containing program codes for a printing method comprising:

a first input step of entering image information;

a second input step of entering at least a part of an execution program;

a third input step of entering copyright information of the execution program;

a display step of displaying the copyright information of the execution program; and a print control step of executing the part of the execution program, thereby controlling a print process of the image information, wherein said display step displays the copyright information of the execution program during the controlling of the print process of the image information in said print control step.

* * * * *

UNITED STATES PATENT AND TRADEMARK OFFICE
CERTIFICATE OF CORRECTION

PATENT NO.     : 6,700,677 B1
DATED          : March 2, 2004
INVENTOR(S)    : Onodera et al.

It is certified that error appears in the above-identified patent and that said Letters Patent is hereby corrected as shown below:

Title page,
Item [57], ABSTRACT,
Line 3, "known" should read -- know --.

Column 1,
Line 26, "is" should read -- is the --; and
Line 27, "the" (first occurrence) should be deleted.

Column 4,
Line 45, "following" should read -- following, --.

Column 5,
Line 57, "following" should read -- following, --.

Signed and Sealed this

Seventh Day of September, 2004

JON W. DUDAS
*Director of the United States Patent and Trademark Office*